United States Patent [19]
Hayashi et al.

[11] Patent Number: 4,792,194
[45] Date of Patent: Dec. 20, 1988

[54] ANTILOCK BRAKE DEVICE FOR VEHICLES

[75] Inventors: Tsutomu Hayashi, Tokyo; Takeshi Kawaguchi; Tetsuo Tsuchida, both of Saitama, all of Japan

[73] Assignee: Honda Giken Kogyo Kabushiki Kaisha, Tokyo, Japan

[21] Appl. No.: 15,557

[22] Filed: Feb. 13, 1987

Related U.S. Application Data

[63] Continuation of Ser. No. 731,565, May 6, 1985, abandoned.

[30] Foreign Application Priority Data

May 9, 1984 [JP] Japan ................. 59-92456
May 30, 1984 [JP] Japan ................. 59-109832
Oct. 26, 1984 [JP] Japan ................. 59-225397

[51] Int. Cl.$^4$ .............................................. B60T 8/40
[52] U.S. Cl. ................................. 303/116; 188/181 A
[58] Field of Search ................... 188/181 A, 181 R; 303/6 A, 6 C, 115, 116

[56] References Cited

U.S. PATENT DOCUMENTS

| | | | |
|---|---|---|---|
| Re. 31,387 | 9/1983 | Bayliss .......................... 303/115 |
| 2,818,244 | 12/1957 | Ropar ........................... 264/1 |
| 2,920,924 | 1/1960 | Reswick et al. ............... 303/24 |
| 3,046,060 | 7/1962 | Stager et al. . |
| 3,403,761 | 10/1968 | Rockwell ...................... 188/265 |
| 3,667,816 | 6/1972 | Harned . |
| 3,731,767 | 5/1973 | Lefort .......................... 188/72.2 |
| 3,829,166 | 8/1974 | von Loewis of Menar et al. . |
| 4,036,331 | 7/1977 | Hayashi et al. ............... 188/187 |
| 4,046,427 | 9/1977 | Baynes et al. ................ 303/115 |
| 4,110,647 | 8/1978 | Eslinger et al. ........... 188/181 R X |
| 4,189,190 | 2/1980 | Luepertz ...................... 303/6 C |
| 4,225,020 | 9/1980 | Blomberg .................... 188/181 R |
| 4,235,316 | 11/1980 | Blomberg .................... 188/181 R |
| 4,260,170 | 4/1981 | Terai et al. ................... 280/276 |
| 4,260,201 | 4/1981 | Farr ............................. 303/99 |
| 4,281,881 | 8/1981 | Mekosh et al. ............... 303/99 |
| 4,340,258 | 7/1982 | Farr ............................. 303/115 |
| 4,350,396 | 9/1982 | Mortimer ..................... 303/115 |
| 4,353,440 | 10/1982 | Farr ............................. 188/181 A |

(List continued on next page.)

FOREIGN PATENT DOCUMENTS

| | | | |
|---|---|---|---|
| 961569 | 1/1975 | Canada ...................... 188/181 R |
| 55-14295 | 4/1980 | Japan . |
| 55-45421 | 11/1980 | Japan . |
| 57-33052 | 2/1982 | Japan . |
| 676708 | 7/1952 | United Kingdom . |
| 778765 | 7/1957 | United Kingdom . |
| 894577 | 4/1962 | United Kingdom . |
| 895294 | 5/1962 | United Kingdom . |
| 2029914 | 3/1980 | United Kingdom ........... 188/181 A |
| 2069642 | 8/1981 | United Kingdom . |
| 2069641A | 8/1981 | United Kingdom . |
| 2070166 | 9/1981 | United Kingdom ........... 188/181 A |
| 2109494A | 6/1983 | United Kingdom . |

OTHER PUBLICATIONS

SAE Technical Series 830484, pp. 1–8, "Performance of Antilock Brakes with Simplified Control Technique", by Makoto Satoh & Suji Shiraishi, 1983.
SAE Section 5: Technical Sessions, pp. 903–909, "Performance of a Simplified Control Technique for Antilock Brakes," by Makoto Satoh & Shuji Shiraishi, 1983.

Primary Examiner—Duane A. Reger
Attorney, Agent, or Firm—Lyon & Lyon

[57] ABSTRACT

An antilock brake device for vehicles including a sensor for sensing the possibility of wheel lock during braking by means of overrunning rotation of a flywheel interlocked with the wheel to produce an output and a hydraulic controller for reducing the braking hydraulic pressure of the wheel brake upon reception of the output from the sensor and increasing the braking hydraulic pressure when the output from the sensor is eliminated. The flywheel and a transmission for transmitting the rotation of the wheel to the flywheel are arranged in the hollow portion of a hub of the wheel. Transmission mechanisms are employed to separate components within the hub to further reduce the overall size of the system. A variety of embodiments also disclose cooperation between front and rear brakes to improve braking response and efficiency.

54 Claims, 8 Drawing Sheets

U.S. PATENT DOCUMENTS

| | | | |
|---|---|---|---|
| 4,354,715 | 10/1982 | Farr et al. | 303/116 |
| 4,355,849 | 10/1982 | Wilson | 303/116 |
| 4,365,538 | 12/1982 | Andoh | 91/1 |
| 4,377,221 | 3/1983 | Farr | 188/181 A |
| 4,381,049 | 4/1983 | Crossman | 188/72.7 |
| 4,381,125 | 4/1983 | Wilson | 303/116 |
| 4,387,934 | 6/1983 | Farr | 303/116 |
| 4,401,348 | 8/1983 | Farr | 303/116 |
| 4,405,006 | 9/1983 | Preusker | 152/170 |
| 4,405,181 | 9/1983 | Resch et al. | 303/9 |
| 4,408,673 | 10/1983 | Leiber | 180/141 |
| 4,414,630 | 11/1983 | Harris et al. | 364/426 |
| 4,416,353 | 11/1983 | Ivanov | 188/2 A |
| 4,422,695 | 12/1983 | Farr | 303/115 |
| 4,428,624 | 1/1984 | Farr | 303/116 |
| 4,436,348 | 3/1984 | Farr | 303/115 |
| 4,456,309 | 6/1984 | Rath | 303/10 |
| 4,457,563 | 7/1984 | Farr | 303/92 |
| 4,474,413 | 10/1984 | Farr | 303/116 |
| 4,551,156 | 4/1985 | Offenstadt | 280/276 |

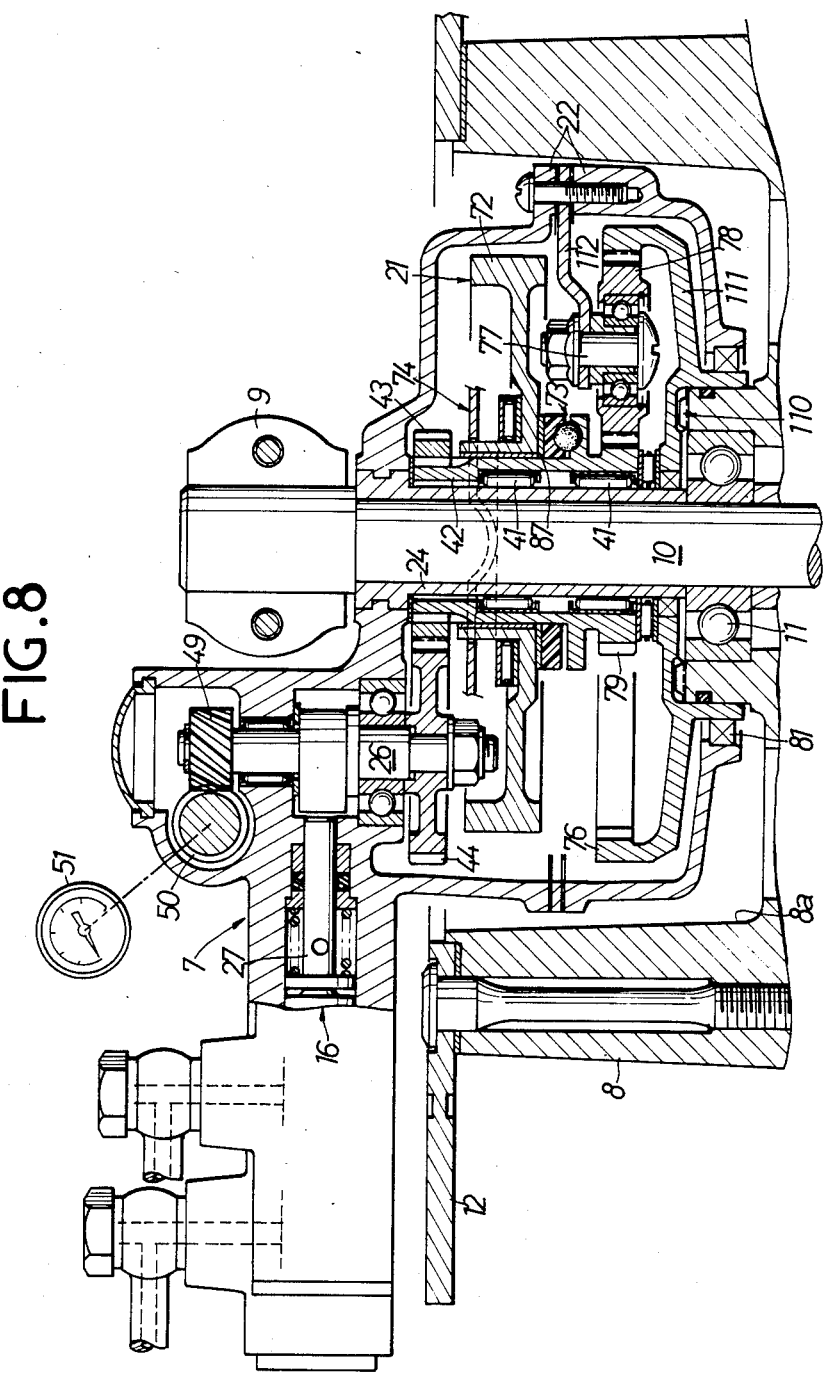

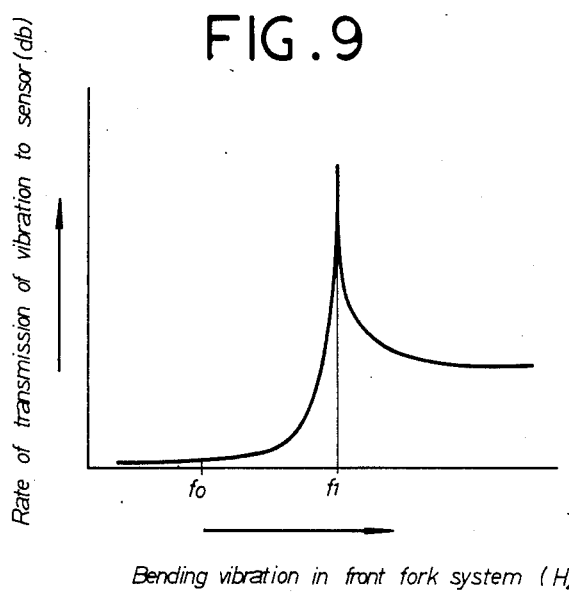
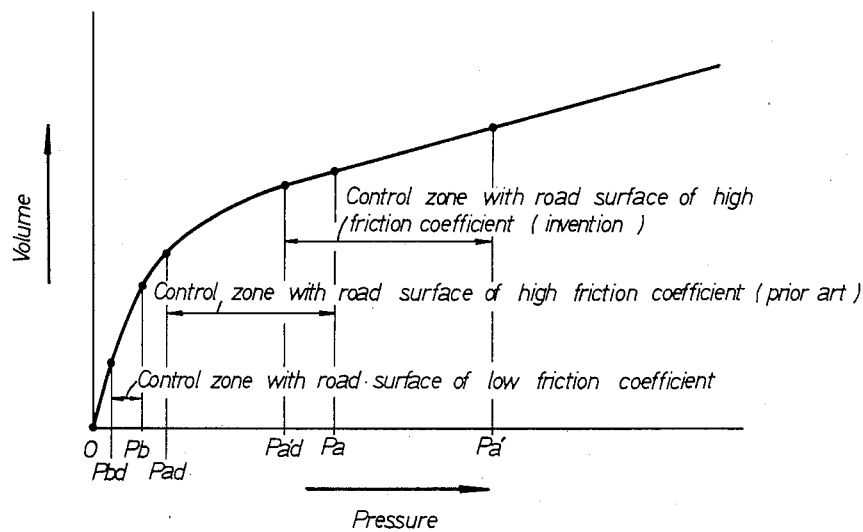

ANTILOCK BRAKE DEVICE FOR VEHICLES

This application is a continuation of application Ser. No. 731,565 filed 5-6-85 now abandoned.

BACKGROUND OF THE INVENTION

The field of the present invention is antilock brake devices for vehicles such as motorcycles and automobiles.

Conventional antilock brake devices have been developed for vehicles which in some manner release or reduce the braking force on a wheel until rolling of the wheel is again achieved. One such conventional antilock brake system is disclosed in Japanese Patent Publication No. 120,440/1981 which includes a sensor designed to recognize the onset of a wheel locking condition during braking. The sensor in turn enables and disables a hydraulic controller which reduces the hydraulic pressure to the wheel brake. The sensor is operatively coupled to a wheel by means of a transmission arranged externally to the wheel to drive a flywheel. Because of this external orientation of the sensor, transmission and related components, the system disclosed in the aforementioned Japanese Patent Publication is subject to adverse effects by external conditions encountering the mechanism. Additionally, the size of the overall braking system including the antilock brake device would be excessively large, particularly for employment on motorcycles or the like which require compact, durable and lightweight elements and systems.

SUMMARY OF THE INVENTION

The present invention is directed to an antilock braking device which is compact and less susceptible to damage and disablement by external conditions. To this end, an antilock braking device is contemplated which employs a flywheel sensing mechanism and a transmission between the flywheel and the vehicle wheel, all of which is contained within a recess in the wheel hub. Through this arrangement, the braking system is compact and protected from external conditions.

Advantageously resulting from the arrangement of the present invention when employed on a steered wheel is the reduction in the moment of inertia contributed by the braking system about the steering axis. In this way, a lighter steering may result. This is found to be of particular import for motorcycles where lightness and maneuverability are desirable features of such vehicles.

In another aspect of the present invention, the axial width of the hub and brake assembly may be minimized through the location of operative components of the system in parallel relationship connected by transmission mechanisms. To this end, the flywheel sensor of the vehicle may be operatively connected to the vehicle wheel. A hydraulic pump shaft may then be operatively connected with the wheel or the shaft of the flywheel in parallel relationship to the flywheel shaft. The resulting assembly can be very compact, thereby conserving space which may be dedicated to the brake system itself. The employment of multiple transmission devices between operative components of the antilock braking system further provides for the advantageous selection of appropriate drive ratios. In this way, the efficiency of each component may be maximized through appropriate ratio selection.

Accordingly, it is an object of the present invention to provide an improved antilock braking mechanism. Other and further objects and advantages will appear hereinafter.

BRIEF DESCRIPTION OF THE DRAWINGS

FIG. 8 is a sectional view similar to that of FIG. 4 illustrating a second embodiment of the present invention.

FIG. 9 is a graphic representation of the relationship between the amount of vibration transmitted to the brake sensor in relationship to the frequency of bending vibration in the front fork system of a motorcycle employing the present invention.

FIG. 11 illustrates a characteristic curve of hydraulic pressure versus volume for the front wheel brake of a motorcycle.

DETAILED DESCRIPTION OF THE PREFERRED EMBODIMENTS

Embodiments of the present invention will be described with specific reference to the accompanying drawings in which all identical or corresponding elements of each of the embodiments will be indicated by corresponding numbers.

Figure 1:
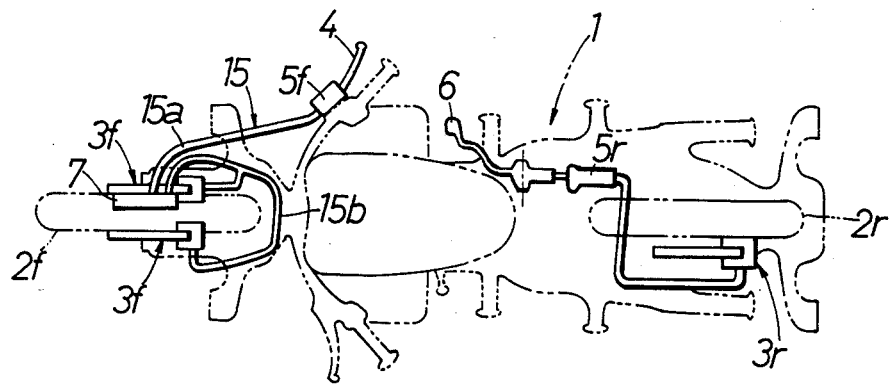
FIG. 1 is a schematic plan view of a motorcycle employing a first embodiment of the present invention.

Looking to the embodiment of FIG. 1, a motorcycle 1 has a pair of front right and left wheel brakes 3f for braking a steering front wheel 2f. A single rear wheel brake 3r is employed for braking a rear wheel 2r of the motorcycle 1. The front brakes 3f are operated by the output of hydraulic pressure from a front master cylinder 5f operated by a brake lever 4. The rear brake 3r is operated by the output of hydraulic pressure from a rear master cylinder 5r which is actuated by a brake pedal 6. In this embodiment, the hydraulic pressure to the front brakes 3f are controlled by an antilock controller 7. Thus, the front wheel 2f and front brakes 3f are employed with the controller 7 in accordance with the present invention.

Figure 2:
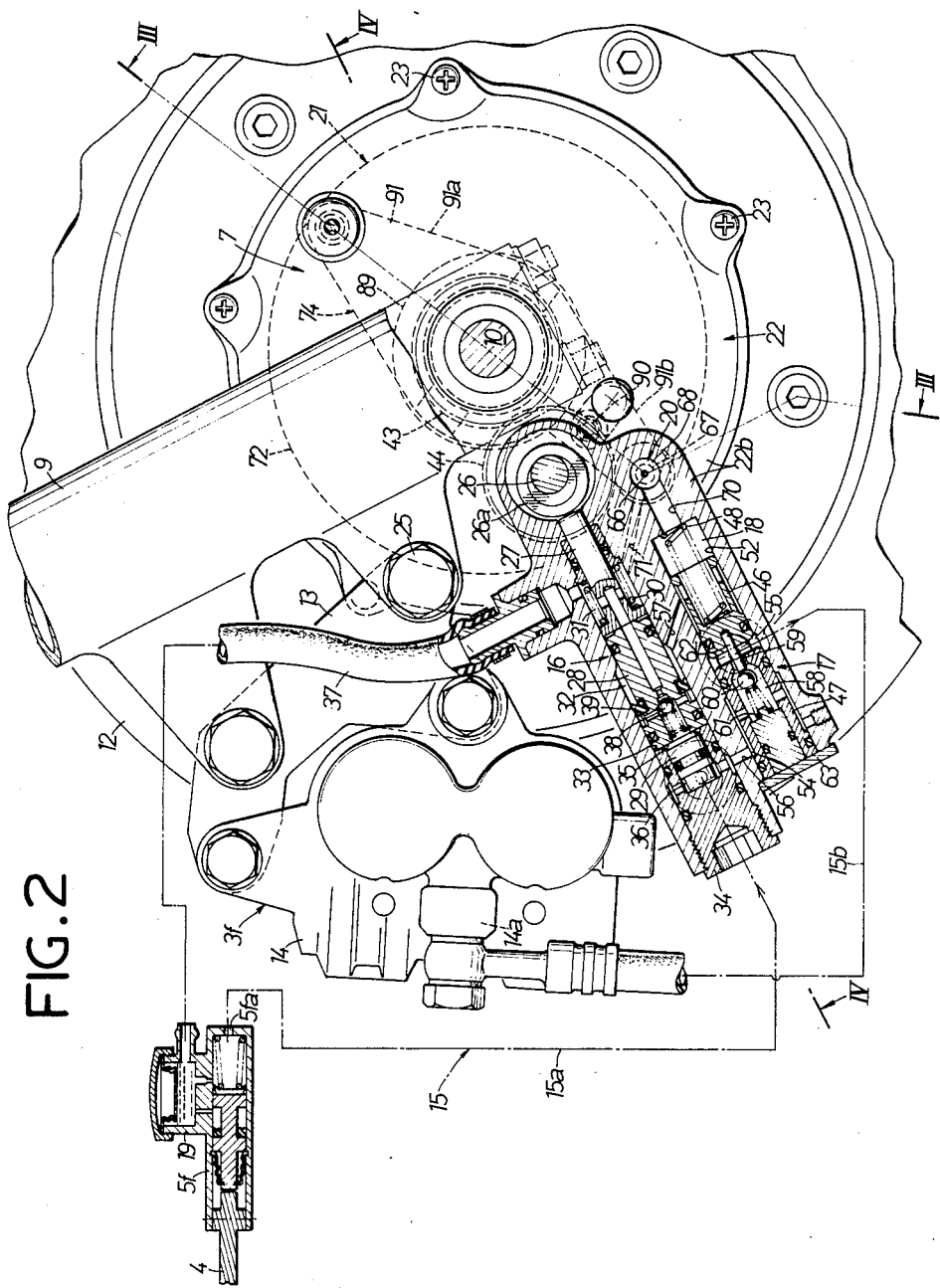
FIG. 2 is a side elevation of a braking device of the present invention with a portion of the mechanism in section for clarity.
Figure 3:
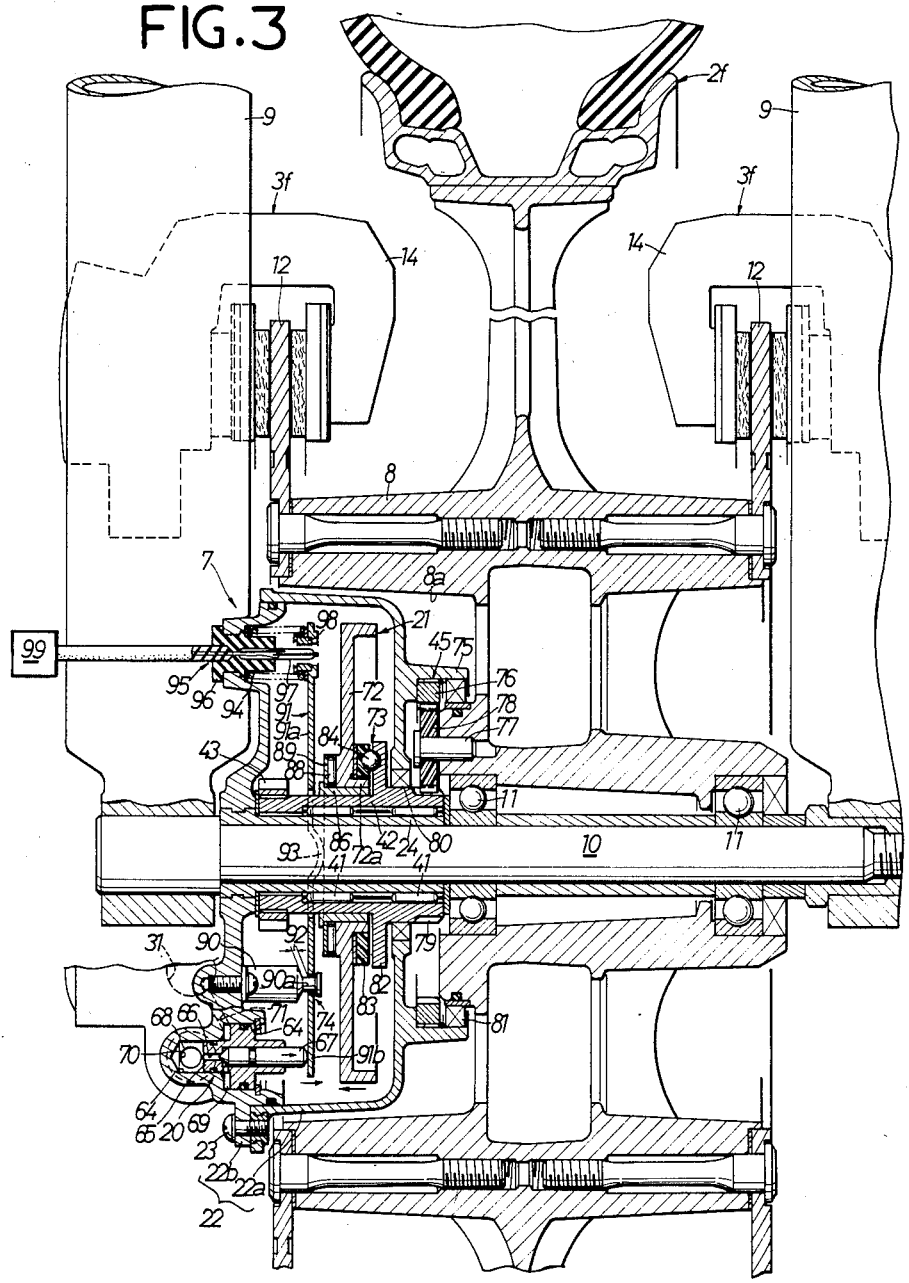
FIG. 3 is a sectional view taken along line III—III of FIG. 2.

Turning to FIGS. 2 and 3, the details of the antilock control mechanism are disclosed. A hub 8 of the wheel 2f is supported through two bearings 11 on an axle 10. The axle 10 is secured to the lower ends of a front fork 9. Each of the brakes 3f includes a brake disc 12 securely fixed to the end face of the hub 8 and a brake caliper 14 straddling the disc 12 and supported by a bracket 13 to the front fork 9. The caliper 14 operates to grip the brake disc 12 when the output of hydraulic pressure from the cylinder 5f is supplied to the input port 14a. In this way, a braking force is applied to the wheel 2f.

The antilock controller 7 is functionally interposed in the hydraulic conduit 15 coupled between the output port 5fa of the cylinder 5f and the input port 14a of the caliper 14. The controller 7 includes within a common casing 22 a hydraulic pump 16 driven by the wheel 2f, a modulator 17 having a hydraulic control chamber 18 to receive the discharge pressure of the pump 16 and a normally closed exhaust pressure valve 20 interposed in a passage between the chamber 18 and a reservoir 19. Also contained within the casing 22 is an inertia type angular deceleration sensor 21 which controls the valve 20 to release pressure from the braking system when conditions of locking of the wheel 2f are first sensed.

The casing 22 has a cup-shaped housing 22a and a cover 22b fixed by screws 23 to the open end of the cup-shaped housing 22a. The housing 22a is arranged in a recess 8a to one side of the hub 8. The cover 22b is positioned at the mouth of the recess 8a. The cover 22b is secured to the axle 10 and the front fork 9. A cylindrical shaft 24, arranged about the axle 10, is secured to the center of the cover 22b. The cover 22b is also connected to the front fork 9 by means of an attachment mechanism so as not to rotate about the axle 10. The attachment mechanism may be of conventional construction as, for example, bolts 25, illustrated in FIG. 2, for clamping a bracket 13 to the front fork 9.

The pump 16 includes a camshaft 26 arranged parallel to and laterally displaced from the axle 10. A pushrod 27 is arranged with its inner end following on the cam surface 26a formed on the camshaft 26. A pump piston 28 is actuated by the outer end of the pushrod 27 which is in turn in contact with an operating piston 29. A return spring 30 is arranged to bias the rod 27 away from the cam surface 26a.

The pushrod 27 and the pump piston 28 are arranged within a first cylindrical hole 33 formed in the cover 22b. The rod 27 and piston 28 slidably arranged within the cylindrical hole 33 define an inlet chamber 31 and an outlet chamber 32 arranged in annular spaces about the rod 27 and piston 28, respectively. A plug 34 is fitted into the outer end of the hole 33 to define a pump chamber 35 at the end of the piston 28. The piston 29 is slidably arranged within the plug 34 as can be best seen in FIG. 2 so as to form a hydraulic chamber 36 in the hollow interior of the plug 34.

The inlet chamber 31 communicates with the fluid reservoir 19 through a conduit 37. This chamber 31 further communicates through a suction valve 38 with the pump chamber 35. The pump chamber 35 in turn communicates with the outlet chamber 32 through a unidirectional sealing member 39. The sealing member 39 provides a discharge valve function. The hydraulic chamber 36 is connected to the upstream conduit 15a of the conduit 15 extending between the master cylinder 5f and the calipers 14. The chamber 36 is thus always in communication with the output port 5fa of the cylinder 5f.

Figure 4:
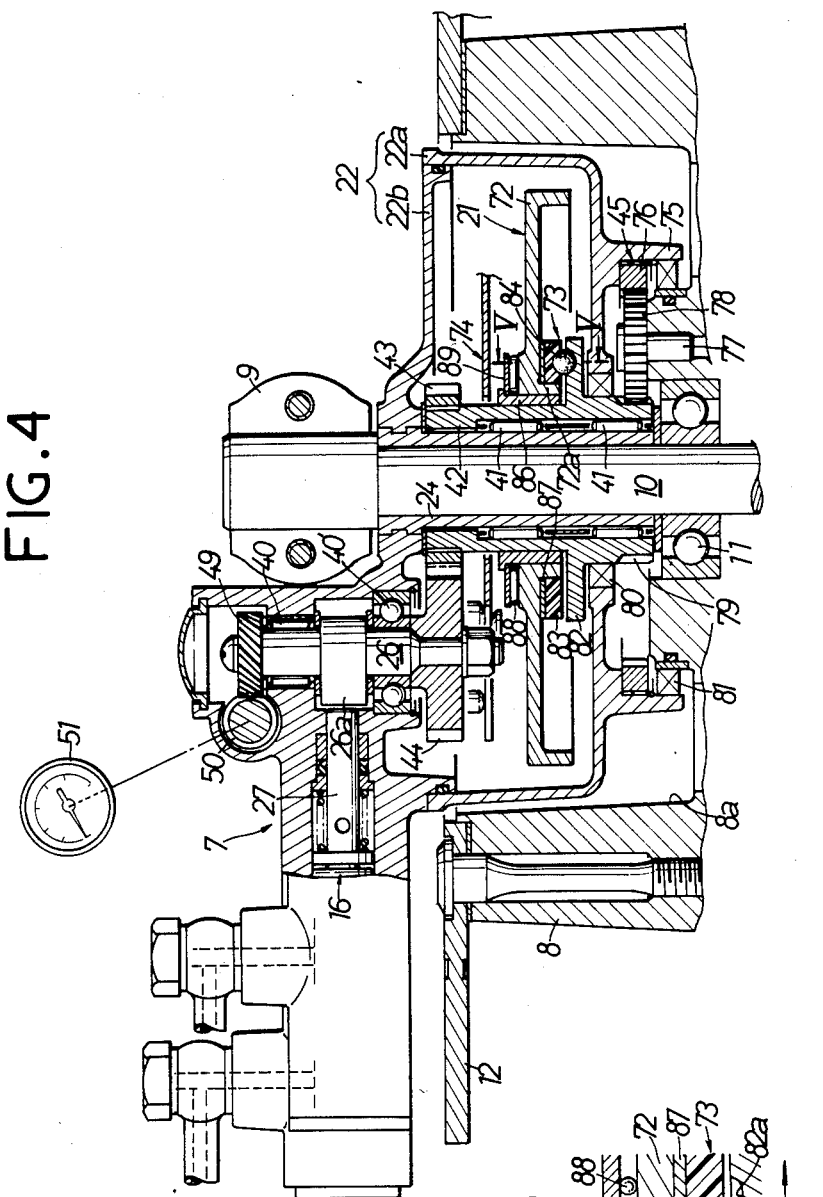
FIG. 4 is a sectional view taken along line IV—IV of FIG. 2.

As illustrated in FIG. 4, the camshaft 26 is supported in the cover 22b through bearings 40 and 40'. This camshaft 26 is driven through a transmission consisting of a pair of gears 43 and 44. The gear 43 is in turn coupled to a drive shaft 42 rotatably supported through bearings 41 about the shaft 24. The shaft 42 is driven by the wheel 2f through a gear unit 45 which provides an increased angular velocity to the shaft 42 over the wheel 2f. The gear unit 45 also serves as a further transmission mechanism as will be described below. As a result, the shaft 26 is driven by the wheel 2f through the gear unit 45.

A meter drive gear 49 is arranged at the opposite end of the camshaft 26 from the gear 44. The meter drive gear 49 is engaged with a gear 50 which is in turn connected to the input shaft of a speedometer 51 of the vehicle.

The modulator 17 includes a pressure reducing piston 46, a stationary piston 47 abutting one end of the pressure reducing piston 46 to restrict the backward movement thereof, and a return spring 48 for biasing the piston 46 into contact with the piston 47. Both the pressure reducing piston 46 and the stationary piston 47 are slidably disposed within a second cylindrical hole 52 which is formed adjacent the first cylindrical hole 33 in the cover 22b.

The piston 46 and the hole 52 define the control hydraulic chamber 18 at one end of the hole 52. Additionally, an output hydraulic chamber 55 is defined within the hole 52 against the piston 47. Around the outer periphery of the piston 47 within the hole 52, an input hydraulic chamber 54 is arranged which communicates with the chamber 36 of the pump 16 through an oil passage 56. The output hydraulic chamber 55 is in communication with the downstream conduit 15b of the conduit 15 between the master cylinder 5f and the brake. The conduit 15b is in communication with the input ports 14a of the brakes 3f. The control hydraulic chamber 18 communicates with the outlet chamber 32 of the pump 16 through an oil passage 57.

The piston 47 has a valve chamber 58 which is formed therein. This valve chamber 58 is always in communication with the input hydraulic chamber 54. The piston 47 also includes a valve port 59 for communication between the valve chamber 58 and the output hydraulic chamber 55. A spherical valve body 60 is positioned within the valve chamber 58 to control communication through the valve port 59. A valve spring 61 biases the valve body 60 to the closed position at the port 59. A valve opening rod 62 controls the valve body 60. This opening rod extends from one end of the pressure reducing piston 46 and maintains the valve body 60 in the open state when the piston 46 is disposed at its retracted limit within the hole 52.

The valve body 60 is formed in this embodiment of a buffer material such as a fibre reinforced resin or ceramic. Corrosion, swelling, wear and impact resistances are important factors in selecting the material for the valve body 60. Additionally, the weight of the valve body may affect performance. The employment of a steel ball such as disclosed in Japanese Patent Publication No. 89,447/1983 has a large specific weight. The large weight of the conventional steel ball valve may prove less responsive than the lighter element and may also exhibit rebounding as it rapidly seats at the valve port 59. With a valve body 60 of lighter specific weight, the inertia effects are reduced and a larger valve body and port may be employed. The increase in size of the valve body 60 and the valve port 59 thereby reduces flow resistance in the system.

An additional effect is realized through the employment of a lighter valve body 60. The spring force of the spring 61 employed for biasing the valve body 60 toward the valve port 59 may be reduced. In turn, the set load for the spring 48 employed for pressing the piston 46 in the direction of increasing pressure in the chamber 55 may also be reduced correspondingly. This reduction contributes to the reduction in the hydraulic pressure remaining in the chamber 55 due to the force of the spring 48 acting on the piston 46 when the piston 46 is reducing the brake pressure resulting from a pressure reduction signal from the sensor 21. In this way, antilock control can be effected reliably even on a road surface exhibiting a low friction coefficient.

The outer ends of the second cylindrical hole 52 is closed by an end plate 63. This end plate is fixed to the cover 22b. The piston 47 extends into contact with the end plate 63 by the resilient force of the spring 48 or by the hydraulic pressure introduced into the chambers 54 and 55.

The pump 16 and the modulator 17 are disposed on the back side of the front fork 9 in a similar arrangement to that of the caliper 14. This provides protection for the mechanism by being located rearwardly of the front fork against objects and other external conditions encountered through forward motion of the vehicle.

The exhaust pressure valve 20 includes a valve seat member 65 which is engaged within a stepped cylindrical hole 64 of the cover 22b as can best be seen in FIG. 3. A valve body 67 is slidably arranged within a cylindrical cavity within the member 65 to control a valve port 66 within the member 65. The member 65 defines an inlet chamber 68 in the reduced diameter portion of the stepped cylindrical hole 64 and an outlet chamber 69 in the enlarged diameter portion of the stepped cylindrical hole 64. The chambers 68 and 69 communicate through the port 66 as controlled by the valve body 67. The chamber 68 communicates with the chamber 18 of the modulator 17 through an oil passage 70. The chamber 69 communicates with the chamber 31 of the pump 16 through an oil passage 71. Therefore, eventually the chamber 69 communicates with the reservoir 19.

The hydraulic pump 16, the modulator 17 and the exhaust pressure valve 20 provided in the cover 22b together form a hydraulic controller in accordance with the present invention.

The wheel angular deceleration sensor 21 includes the accelerating gear unit 45 deriving input from the front wheel 2f. A flywheel 72 is rotated by the gear unit 45. A cam mechanism 73 is employed for converting the overrunning rotation of the flywheel 72 under certain braking conditions into an axial displacement. Finally, an output lever mechanism 74 controls operation of the valve 20 in response to the axial displacement of the cam mechanism 73 responsive to the overrunning of the flywheel 72. The gear unit 45 is arranged outside of the main wall of the housing 22a as can be seen in FIG. 3. The cam mechanism 73, the flywheel 72 and the lever mechanism 74 are disposed within the housing 22a.

The gear unit 45 employs a ring gear 76 which is engaged by means of a spline with the inner periphery of an annular support 75 shown to be integrally formed on the outer surface of the housing 22a. A plurality of planetary gears 78 which are rotatably supported on shafts 77 to the hub 8 engage the ring gear 76 and a sun gear 79. The sun gear 79 is formed at one end of the driveshaft 42. Thus, a planetary gear system is employed for the gear unit 45.

A sealing member 80 is employed between the wall of the housing 22 and the driveshaft 42 at the access port for the driveshaft 42 in the housing 22a. A sealing member 81 is positioned between the support 75 of the housing 22 and the hub 8.

To ensure that the front wheel 2f would not inappropriately lock due to some failure within the braking system, one of the gears or sets of gears of the gear unit 45 is preferably formed of a material which will break upon a predetermined level of torque. In the preferred embodiment, the planetary gear 78 is formed of a synthetic resin material providing that function. The synthetic resin material of the gear also provides a buffering effect to reduce the noise of the planetary gear system and to absorb the inertial shock loading of the flywheel 72. Furthermore, since the gear unit 45 is disposed in the hub 8, further noise reduction is accomplished by the hub itself. Thus, reduction of operating noise and improved durability of the transmission mechanism for the flywheel 72 may be realized.

If the gear 78 does become broken, the speedometer 51 which is operatively connected with the driveshaft 42 and in turn the gear unit 45 ceases to operate. Consequently the driver is notified of the defect in the braking device.

Figure 5:
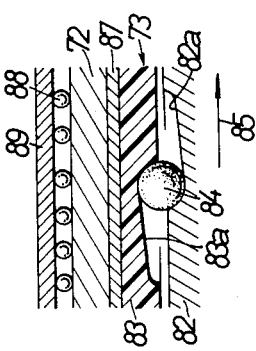
FIG. 5 is an enlarged sectional view of the antilock device taken along line V—V of FIG. 4.

The cam mechanism 73, illustrated in FIG. 5, includes a drive cam plate 82 which is secured to the shaft 42. A driven cam plate 83 is rotatably arranged opposite to the plate 82. A thrust ball 84 is engaged in the cam recesses 82a and 83a formed on the opposing surfaces of the plates 82 and 83. The recess 82a of the cam plate 82 is inclined such that its depth decreases toward the direction of rotation of the shaft 42 as noted by the arrow 85. The recess 83a of the cam plate 83 is inclined so that the recess becomes deeper toward the direction of rotation as indicated by the arrow 85. Consequently, until actuating conditions are sensed, the cam plate 82 is generally arranged relative to the cam plate 83 such that a ball within the recesses 82a and 83a is located in the deepest portion of both recesses. In this position, rotary torque received from the shaft 42 by the cam plate 82 is transmitted to the cam plate 83. Under these conditions, no relative rotation occurs between the cam plates 82 and 83.

When the cam plate 83 is overrun relative to the cam plate 82, relative rotation occurs between the cam plates. As a result, the ball 84 rolls within each recess to a shallower position. As a result, the plates 82 and 83 are axially displaced.

In order to avoid an impact resulting when the ball 84 abruptly reaches the rolling limit within the recesses 82a and 83a, at least one component of the cam mechanism 73 is formed of a synthetic resin material. In the preferred embodiment, the cam plate 83 and the ball 84 are formed of synthetic resin. Consequently, the impact forces produced when the ball abruptly reaches the rolling limit of the recesses 82a and 83a is absorbed by the synthetic plate 83 and ball 84. This can prevent the cam mechanism 73 and the flywheel 72 from vibrating due to such impact forces. Durability is generally improved for the overall system by this mechanism over other devices such as that disclosed in Japanese Patent Publication No. 126,241/1983 in which the components of the cam mechanism are all formed of metal.

The flywheel 72 includes a hub 72a which is rotatably and slidably supported through a bushing 86 on the driveshaft 42. The cam plate 83 is rotatably supported on the hub 72a and is engaged with one side of the flywheel 72 through a friction clutch plate 87. A pressure plate 89 is provided through a thrust bearing 88 on the other side of the flywheel 72. This arrangement may be best illustrated through reference to both FIGS. 3 and 5.

The lever mechanism 74 includes a supporting shaft 90 which projects from the inner surface of the cover 22b at an intermediate position between the axle 10 and the valve 20. A lever 91 is loosely supported in the axial direction of the axle 10 at a neck 90a at the end of the shaft 90. A predetermined clearance or play 92 is provided in the axial direction between the neck 90a and the lever 91. The lever 91 is composed of a long first arm 91a as illustrated in FIGS. 2 and 3 which extends around the shaft 42 from the supporting shaft 90. A short second arm 91b extends from the shaft 90 toward the valve 20. Midway on the arm 91a, a portion thereof is raised to define an abutment portion 93 which abuts against the outside surface of the plate 89.

A spring 94 is interposed in a compressed state between the end of the arm 91a and the cover 22b because the arm 91 abuts against the plate 89. The arm 91b, as a consequence of this arrangement, is held against the outer end of the valve body 67 of the valve 20. The resilient force of the spring 94 acts on the lever 91 to press the abutment portion 93 of the arm 91a against the plate 89 which in turn presses the arm 91b against the valve body 67 of the valve 20 to hold the valve body 67 in a closed state. The resulting force of the spring 94 acting through the lever 91 is also applied to the flywheel 72, the clutch plate 87 and the cam plate 83 through the plate 89 with a predetermined frictional engagement force. This force acts to press the plates 82 and 83 toward one another. The frictional engaging force is set such that the clutch plate slips when the rotary torque between the cam plate 83 and the flywheel 72 exceeds a predetermined level.

In the embodiment described above, the natural frequency $f_0$ of the sensor 21 in the axial direction of the flywheel 72 is arranged to be significantly smaller than the frequency $f_1$ of the front fork 9 in its longitudinal bending direction. The natural frequency of the sensor 21 is determined by the angles of inclination of the bottoms of the recesses 82a and 83a, the rolling radius of the thrust ball 84, the ratio of the effective lever lengths of the lever 91 relative to the plate 89 and the body 87 and the spring constant of the spring 94.

A detector 95 for detecting the normal operation of the lever mechanism 74 is connected to the lever mechanism. The detector 95 comprises a switch holder 96 secured to the cover 22b and protruding into the center of the coil of the spring 94. A lead switch 97 held by the holder 96 in the coil of the spring 94, a permanent magnet 98 attached to the arm 91a adjacent the switch 97 and a displaced circuit 99 connected to the switch 97 are arranged such that when the arm 91a is rocked by a predetermined angle relative to the cover 22b, the magnet 98 is displaced to close the position of the switch 97.

Figure 6:
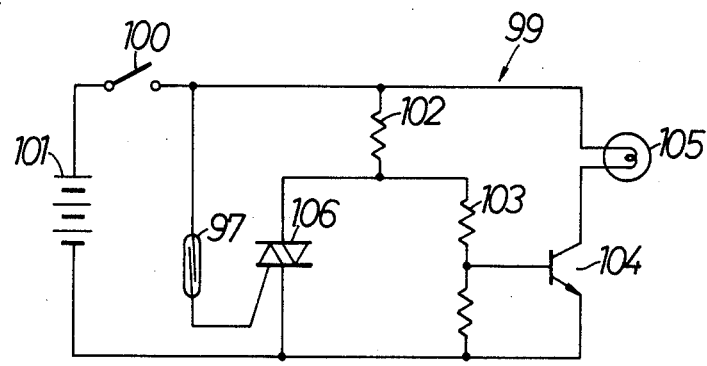
FIG. 6 is a circuit diagram of a display circuit for the device of FIG. 2.

The display circuit 99 is constructed as shown in FIG. 6. When a main switch 100 is closed, a current flows from a power source 101 through the main switch 100 and resistors 102 and 103 to the base of a transistor 104. Thus, the transistor 104 conducts with the result that a display lamp 105 is energized through the switch 100 to the ON position. When the switch 97 is temporarily closed by the approach of the magnet 98 under this condition, a current flows to the gate of a thyristor 106 through the switch 97. Thus, the thyristor 106 conducts, the current fed through the resistor 102 flows to the thyristor 106 and the transistor 104 is interrupted. In this way, the lamp 105 is turned off. Therefore, the rocking motion of the lever 91 relative to the cover 22b against the elastic force of the spring 94 can be indicated by the lamp 105 turning off. Even if the switch 97 is then opened by the reset of the lever 91, the OFF state of the lamp 105 is held by the thyristor 106 until the main switch 100 is opened and again closed. The main switch 100 may be an ignition switch or brake switch of the motorcycle.

Figure 7:
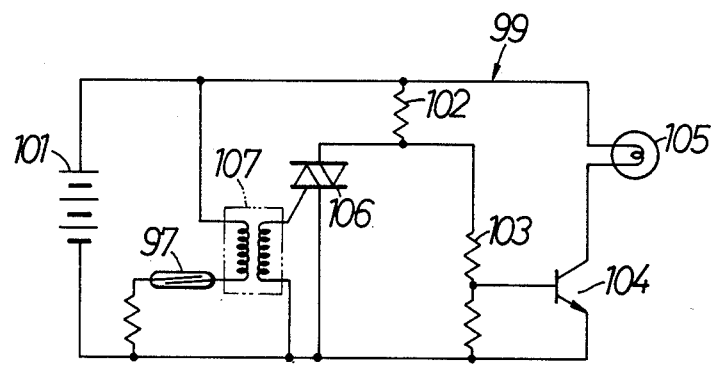
FIG. 7 is a circuit diagram of a modification of the diagram of FIG. 6.

As shown in FIG. 7, an induction 107 may be used instead of the switch 100. More particularly, the primary side of the coil 107 may be connected to the switch 97 and the secondary side may be connected to the gate of the thyristor 106. This second construction is similar to that shown in FIG. 6 and the corresponding components are designated by the same reference numbers as those in FIG. 6. In the construction, when the switch 97 is opened or closed, positive and negative pulses are alternatively generated at the secondary side of the coil 107, thereby repeating the conduction and interruption states of the thyristor 106. Thus, the lamp 105 is caused to flash. By this means, the operation of the lever 91 can be confirmed by the flashing of the lamp 105.

In operation, when the vehicle is running without braking, the driveshaft 42 is driven through the gear unit 45 from the rotating wheel 2f. The flywheel 72 is then driven through the cam mechanism 73 and the clutch plate 87. Thus, the flywheel 72 is rotated at a speed faster than the wheel 2f. This provides additional rotary inertia to the flywheel 72 with minimum weight. At the same time, the cam shaft 26 and the speedometer 51 are driven by the shaft 42.

When the master cylinder 5f is operated to brake the wheel 2f, the hydraulic pressure output is transmitted sequentially through the upstream conduit 15a of the conduit 15, the chamber 36 of the pump 16, the chamber 54 of the modulator 17, the chamber 58, the valve port 59, the chamber 55 and the downstream conduit 15b of the conduit 15 to the front brake 3f. Braking force is thus applied to the wheel 2f.

In the pump 16, the output hydraulic pressure of the master cylinder 5f is introduced to the chamber 36. Thus, the pump piston 28 is reciprocated by the action of the hydraulic pressure on the piston 29 and the lifting action of the push rod 27 responsive to the cam surface 26a. During the suction stroke of the piston 28 when the piston moves toward the pushrod 27, the valve 38 is opened and the oil from the reservoir is sucked through the conduit 37 and the chamber 31 to the chamber 35. During the discharge stroke of the piston 28 with the piston 28 moving toward the operating piston 29, the sealing member 39 opens to feed the hydraulic fluid in the chamber 35 to the chamber 32 and further through the oil passage 57 to the chamber 18 of the modulator 17. When the pressures of the chambers 32 and 18 rise to a predetermined level, the piston 28 is held in contact with the plug 34 by the pressure of the chamber 32.

Since the communication between the chamber 18 of the modulator 17 and the reservoir 19 is initially interrupted by the closing of the valve 20, the hydraulic pressure supplied to the chamber 18 acts directly on the piston 46 to press the piston 46 to its retracted position. Thus, the valve body 60 is held in the valve open state by the rod 62. This allows the output hydraulic pressure of the cylinder 5f to pass therethrough. The brake force applied to the brakes 3f becomes proportional to the hydraulic pressure of the cylinder 5f at the initial stage of braking.

When an angular deceleration is generated by the wheel 2f in response to the braking, the flywheel 72 senses the deceleration and tends to overrun the driveshaft 42 by the stored inertial force in the flywheel 72. The relative movement of the flywheel 72 under this condition produces relative rotation between the cam plates 82 and 83 to axially displace the flywheel 72 by the thrust generated by the rolling of the ball 84. In turn, the plate 89 is forced axially to push the lever 91.

The motion of the lever 91 in response to movement of the plate 89 first acts to overcome the play 92 between the shaft 90 and lever 91. If the axial motion continues, the lever 91 is pressed by the plate 89 to rock about the valve body 67 serving as a fulcrum. When the rocking motion of the lever 91 advances to a predetermined degree, the play 92 between the shaft 90 and the lever 91 is eliminated and the fulcrum of the lever moves from the valve body 67 to the shaft 90 which is closer to the advancing plate 89. Up until the fulcrum of the lever 91 is moved to the shaft 90, the motion of the device does not result in any operative change. Under this condition, relatively little resistance force to the axial movement of the plate 89 is encountered and is independent of the spring force of the spring 94. Once the play has been taken up, the lever 91 does not further rock until the axial force of plate 89 reaches a predetermined value. Once reached, braking pressure is generated resulting in a small angular deceleration of the wheel 2f. This motion of the lever 91 acts to bring the permanent magnet 98 toward the closed position with the switch 37. The display circuit 99 is operated as described above by this motion of the permanent magnet 98 to notify the driver that the sensor 21 is operating normally.

With the hydraulic control system of the antilock controller 7 providing an indication of proper operation during initial braking beyond the play of the system and before the antilocking mechanism is activated, the vehicle operator is reassured before antilocking operation is necessary that the system is operating properly. This mode of operation is unavailable in the device disclosed in Japanese Patent Publication No. 12641/1983.

When the wheel 2f is about to lock due to excessive brake force or a decrease in the frictional coefficient of the road surface, the force of the plate 89 exceeds a predetermined value. This results from the abrupt increase in the angular deceleration of the wheel 2f beyond that of normal braking. As a result, the lever 91 rocks further about the shaft as a fulcrum to compress the spring 94. The arm 91b of the lever 91 rocks to separate the valve body 67 at the same time that the spring 94 is being compressed. Consequently, valve 20 is opened.

When the valve 20 opens, the hydraulic pressure in the chamber 18 is exhausted through the passage 70, the chamber 68, the port 66, the chamber 69, the passage 71, the chamber 31 of the pump 16 and the conduit 37 to the reservoir 19. Consequently, the piston 46 is returned by the hydraulic pressure of the chamber 55 toward the chamber 18 against the tension of the spring 48. As a result, the rod 62 is retracted to close the valve body 60. The valve body 60 then interrupts the communication between the chambers 54 and 55 and increases the volume of the chamber 55. The brake hydraulic pressure acting on the brake 3f then decreases to reduce the brake force of the wheel 2f. The reduction in the brake force results in the avoidance of locking.

With reduction in the braking force, the wheel 2f is again accelerated. The pressing force of the plate 89 against the lever 91 decreases and the lever 91 rocks toward the at-rest position by the force of the spring 94. Consequently, valve 20 is able to close. When valve 20 closes, the hydraulic oil discharged from the pump 16 is immediately sealed in the chamber 18. The piston 46 then retracts toward the chamber 55 to raise the hydraulic pressure in the chamber 55. This again increases brake force. This operation is repeated at high frequency if possibility of locking continues to be exhibited. As a result, average brake force is reduced to the point that effective braking of the wheel 2f can occur.

In the brake device thus constructed, the flywheel 72 of the antilock controller 7 and the gear unit 45 are arranged in the hollow portion of the hub 8 which would otherwise be a wasted space. Consequently, the space in the hub may be effectively utilized as a means for providing a compact braking device. Furthermore, the flywheel 72 and the gear unit 45 can be protected through the placement of the system within the hub 8 from adverse external conditions. Since the transmission for operatively connecting the flywheel 72 and the wheel 2f is constructed to include the gear unit 45, the flywheel 72 can be lighter in weight and provide a large inertial force through high-speed rotation of a light flywheel 72 sized to fit within the restricted hollow portion of the hub 8. Additionally, since the pump 16, the modulator 17 and the valve 20 are provided in the cover 22b arranged at the inlet of the hub recess 8a, the piping to the additional components of the braking system is facilitated. In the design of the preferred embodiment, care has been taken to ensure easy disassembly of the gear unit 45 such that the flywheel 72 may be easily removed for improved maintenance efficiency.

With the driveshaft and the camshaft 26 divided into separate components and arranged in parallel within the recess 8a of the hub 8, the axial width of the antilock controller 7 can be maintained at a minimum, making possible the containment of the mechanism within the hub 8.

In the foregoing embodiment, the front fork 9 is forced backward by the braking force of the vehicle. Naturally, when this braking force is released, the resiliency of the front fork 9 causes it to move forwardly relative to the vehicle. When the antilock mechanism is operating, a frequency of vibration is experienced in the braking force to the front fork 9. It has been determined that the sensor 21 loses its effectiveness when it operates at a frequency near the resonance of the front fork 9 in its fore and aft movement responsive to braking force. FIG. 9 illustrates the resonance curve responsive to variation in the frequency of operation of the sensor 21. As is apparent from FIG. 9, the transmission of vibration to the sensor 21 abruptly increases when the frequency of operation of the sensor 21 approaches the natural frequency of the fork. It may also be observed from FIG. 9 that the transmission of vibration decreases when the natural frequency $f_1$ is exceeded but not below a minimum value.

In response to the foregoing, the preferred embodiment of the present invention provides a sensor 21 having a frequency $F_0$ intentionally set to be significantly lower than the natural frequency $F_1$ of the front fork 9. As a result, even if the drive shaft 42 is vibrated by the wheel 2f, the sensor 21 receives only a small amount of vibration and interference with the performance of the sensor 21 is reduced.

FIG. 8 illustrates a second embodiment of the present invention. A gear unit 45 is constructed in the same manner as that of the first embodiment of the invention with the exception that a ring gear 76 is formed on an input member 111 which is driven through axially interlocking surfaces such as radial splines 110 by a hub 8. The gear unit 45 includes the annular gear 76, planetary gears 78 supported on shafts 77 on a carrier 112 and additional corresponding components to those of the first embodiment. Same reference numerals are employed in this second embodiment as on the first embodiment.

Figure 10:
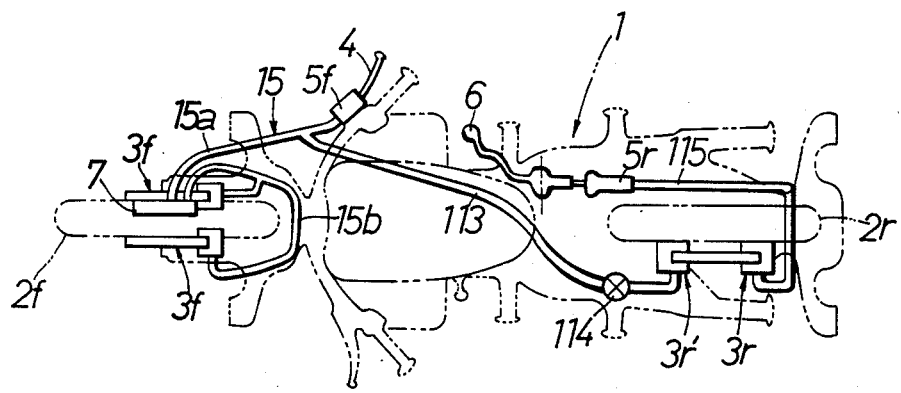
FIG. 10 is a schematic plan view of a motorcycle employing a third embodiment of the antilock brake device of the present invention.

FIG. 10 illustrates a third embodiment of the present invention. In addition to the first embodiment of FIG. 1, a second rear wheel brake 3r' is provided and a proportional pressure reducing valve 114 is interposed in a connecting conduit 113 between the input port of the brake 3r' and a front master cylinder 5f. The valve 114 may be of a conventional type adapted for proportionally reducing the hydraulic pressure at the input side to transmit a reduced pressure to the output side. The conduit 113 is in communication with the upstream conduit 15a of the hydraulic conduit 15. A hydraulic conduit 115 extends from the output port of the rear master cylinder 5r and is connected to the input port of the first brake 3r. The brake 3r operates only when the cylinder 5r is operated.

In an antilock brake device for a motorcycle and other small two-wheeled vehicles, the braking characteristics of the front wheel depend upon the pressure volume characteristic of the front wheel brake when an antilock controller employing angular deceleration sensors driven by a front wheel controls hydraulic braking pressure. The pressure volume characteristic, as can be seen in FIG. 11, is generally not proportional. Rather, the relationship of volume to pressure generally varies greatly in the low pressure range and varies less greatly in the high pressure range.

Difficulties have been encountered in the employment of antilock devices to cover braking conditions both on surfaces having low efficients of friction and on surfaces having high coefficients of friction. To accommodate braking on surfaces having low coefficients, where pressure ranges of Pb to Pbd of FIG. 11 are encountered, the sensitivity of the sensor may be raised. However, by accommodating the higher sensitivity, the antilock controller 7 operates in the range Pa to Pad near the range of Pb to Pbd when braking on road surfaces having a higher coefficient of friction resulting in greater braking pressures being applied. The large volumetric change is still experienced in this latter range for high pressure braking when the low pressure braking conditions are thus accommodated. The resulting feeling to the operator is generally objectionable under such conditions.

To satisfy the antilock performance with an acceptable braking feeling on road surfaces having a high coefficient of friction, it is preferable to operate the antilock controller well into the high pressure range with less volumetric change.

As a means for eliminating the foregoing conflicting requirements, some mechanism for switching sensitivity depending on braking conditions may be contemplated. However, great mechanical complexity would be required or burdensome requirements placed on the operator.

The foregoing difficulty is generally overcome by the mechanism of the third embodiment of the present invention. The second rear wheel brake 3r' is constructed to be simultaneously operated when the front brakes 3f are actuated. The resulting load on the front wheel 2f is increased by the additional moment caused by the rear braking force on rear wheel 2r. Thus, the friction force resulting from the increased normal force of the front wheel 2f on the road shifts the operating range for the antilock controller 7 into the high pressure range even on surfaces of lower coefficient of friction. This operating range is represented in FIG. 11 as the area Pa' to Pa'd. In this range, the volumetric change is reduced and the variations in the acceleration and deceleration of the vehicle accompanying the operation of the antilock controller 7 is reduced. In this way, the brake feeling and brake efficiency may be improved. The load applied to the rear wheel 2r during braking may be reduced by the pressure reducing function of the valve 114 to maintain a braking balance for the entire vehicle.

Figure 12:
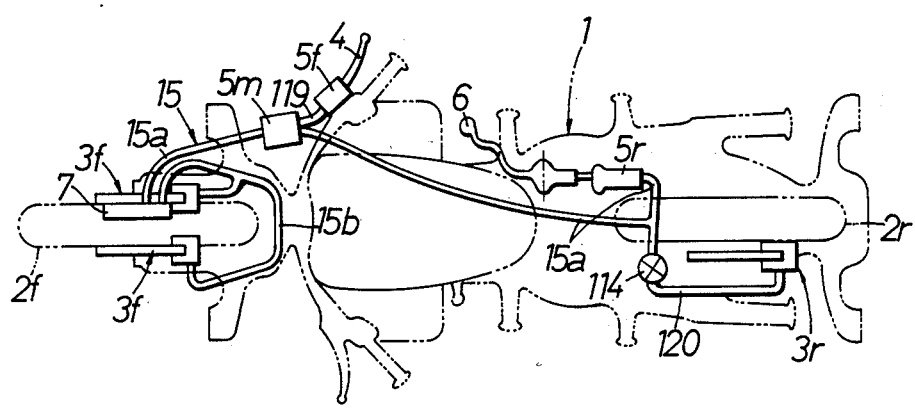
FIG. 12 is a schematic plan view of a motorcycle employing a fourth embodiment of an antilock brake device of the present invention.
Figure 13:
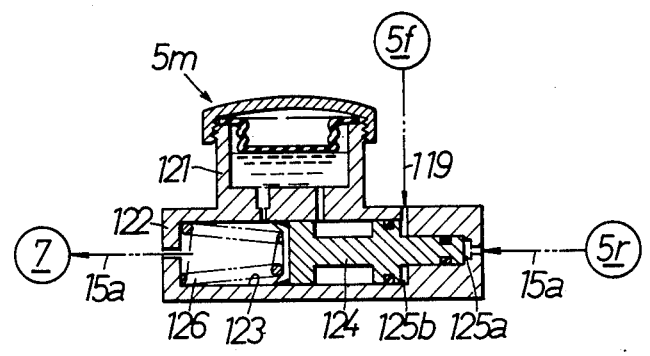
FIG. 13 is a sectional view of a relay master cylinder of the device of FIG. 12.

FIGS. 12 and 13 illustrate a fourth embodiment of the present invention. In this embodiment, the front and rear wheel brakes 3f and 3r can be simultaneously actuated by the operation of the rear master cylinder 5r. More particularly, the upstream conduit 15a of the hydraulic conduit 15 is placed in communication with the output port of the rear master cylinder 5r. A relay master cylinder 5m is interposed in the conduit 15a. This relay master cylinder 5m comprises a cylinder body 122 including an oil reservoir 121 and a stepped piston 124 slidably fitted in a cylindrical hole 123 of the cylinder body 122. The stepped piston 124 partitions the interior of the cylindrical hole 123 into first and second hydraulic input chambers 125a and 125b arranged in parallel. A hydraulic output chamber 126 is opposed to the first and second input hydraulic chambers 125a and 125b. The upstream side of the conduit 15a extending from the output port of the master cylinder 5r is connected to the first input hydraulic chamber 125a and the downstream side of the conduit 15a in communication with the antilock controller 7 as connected to the output hydraulic chamber 126. A hydraulic conduit 119 extending from the output port of the master cylinder 5f is connected to the second input hydraulic chamber 125b. One rear wheel brake 3r is provided. A conduit 120 in communication with the conduit 15a is connected to the brake 3r. A proportional pressure reducing valve 114 is interposed in the conduit 120. Otherwise, the construction remains the same as that of the third embodiment of the present invention.

When the master cylinder 5r is operated, the hydraulic output pressure is introduced to the first input hydraulic chamber 125a of the relay master cylinder 5m. This moves the piston 124 forward generating greater hydraulic pressure in the chamber 126. The hydraulic pressure is then transmitted through the controller 7 to the brakes 3f. The output hydraulic pressure of the master cylinder 5r is also transmitted through the valve 114 to the brake 3r to simultaneously operate the front and rear brakes. Thus, brake forces are simultaneously applied to the front and rear wheels 2f and 2r by the operation of the master cylinder 5r. Simultaneously, the hydraulic brake pressure to the brake 2f is controlled by the controller 7 in the same manner as in the first embodiment of the present invention.

When only the master cylinder 5f is operated, the pressure in the chamber 125b of the relay cylinder 5m is raised by the output hydraulic pressure to move the piston 124 forwardly. This results in the front wheel brake 3f being operated alone.

According to the third and fourth embodiments of the present invention as defined above, the rear brake can be simultaneously operated when the front brake is operated. The effect of this operation is that the ground load to the front wheel is increased at braking. The operating range of the antilock controller is thus shifted to the high pressure side at braking on road surfaces having high coefficients of friction. As illustrated in FIG. 11, the variation in volume of the hydraulic chamber of the front wheel brake is thus reduced. This results in a decrease in the variation between acceleration and deceleration of the vehicle responsive to the antilock mechanism. Thus, the brake feeling is improved and the braking efficiency may be enhanced. In addition, it is not necessary to decrease the sensitivity of the sensor of the antilock controller or to reduce the gain of the front wheel brake. Consequently, the construction of the brake device advantageously can be simplified and the operability improved.

Accordingly, improved antilock braking systems have been disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. An antilock brake device for a vehicle having a suspension for mounting a wheel, comprising
   an axle mounted to the suspension;
   a wheel hub rotatably mounted about said axle and having an enlarged recess on a first side thereof about said axle;
   a hydraulic brake system;
   a deceleration sensor including a flywheel positioned within said recess of said wheel hub about said axle, said flywheel being positioned concentrically about said axle;
   a transmission coupled with the wheel hub and said deceleration sensor and positioned within said recess of said wheel hub about said axle; and
   a hydraulic modulator coupled with said hydraulic brake system and with said deceleration sensor.

2. The antilock brake device of claim 1 wherein said transmission includes a planetary gear train having a sun gear, planetary gears, a ring gear and a plurality of planetary gear shafts rotatably mounting said planetary gears, and a drive shaft rotatably mounted about said axle, said sun gear being fixed to said drive shaft, and said wheel hub being coupled with one of said ring gear and said plurality of planetary gear shafts, the other of said ring gear and said plurality of planetary gear shafts being fixed relative to the suspension.

3. The antilock brake device of claim 2 wherein said wheel hub is coupled with said ring gear.

4. The antilock brake device of claim 2 wherein said wheel hub is coupled with said plurality of planetary gear shafts.

5. An antilock brake device for a vehicle having a suspension for mounting a wheel, comprising
   an axle mounted to the suspension;
   a wheel hub rotatably mounted about said axle and having an enlarged recess on a first side thereof about said axle;
   a hydraulic brake system;
   a deceleration sensor including a flywheel positioned within said recess of said wheel hub about said axle, said flywheel being positioned concentrically about said axle;
   a transmission coupled with the wheel hub and said deceleration sensor and positioned within said recess of said wheel hub about said axle; and
   a hydraulic modulator coupled with said hydraulic brake system and with said deceleration sensor,
   wherein said modulator is arranged outwardly of said enlarged recess of said wheel hub at the inlet thereto.

6. The antilock brake device of claim 1 wherein said modulator includes a hydraulic pump having a pump shaft, said pump shaft being coupled with said transmission.

7. The antilock brake device of claim 6 further comprising a pump transmission coupling said pump shaft to said transmission.

8. The antilock brake device of claim 6 wherein said pump shaft is a camshaft.

9. The antilock brake device of claim 8 wherein said camshaft is rotatably mounted parallel to said drive shaft.

10. The antilock brake device of claim 1 further comprising a cover extending substantially across the inlet of said enlarged recess of said wheel hub, said cover being fixed relative to the suspension and extending into said enlarged recess to surround said deceleration sensor.

11. The antilock brake device of claim 10 wherein said transmission includes a planetary gear train having a sun gear, planetary gears, a ring gear and a plurality of planetary gear shafts rotatably mounting said planetary gears, said cover being coupled with one of said plurality of planetary gear shafts and said ring gear.

12. The antilock brake device of claim 11 wherein said ring gear is fixed to said cover.

13. The antilock brake device of claim 11 wherein said plurality of planetary gear shafts are fixed relative to said cover.

14. The antilock brake device of claim 1 wherein said transmission includes a planetary gear train, said flywheel and said planetary gear train being mounted about axes parallel to said axle.

15. The antilock brake device of claim 1 wherein said transmission includes a planetary gear train, said wheel hub, the suspension and said flywheel being operatively coupled with said planetary gear train, said flywheel being operatively coupled to said wheel hub to rotate at a greater speed than said wheel hub.

16. The antilock brake device of claim 1 wherein said transmission includes a gear train having at least one frangible member constructed and arranged to provided predictable decoupling of said transmission upon excess torque.

17. The antilock brake device of claim 16 wherein said frangible member is of synthetic resin material.

18. The antilock brake device of claim 10 wherein said gear train is a planetary gear train, said frangible member being planetary gears in said planetary gear train.

19. The antilock brake device of claim 1 wherein said deceleration sensor further includes a lever mechanism having an output lever, a first bias means for resisting angular movement of said output lever relative to said hydraulic modulator and a pivot for said output lever spaced from said bias means, said modulator having a valve body spaced from said bias means and said pivot, and extending to said output lever, said pivot having a pivot surface displaced from said output lever with said deceleration sensor not sensing deceleration, said lever having first stage movement to engage said pivot and second stage movement about said pivot.

20. The antilock brake device of claim 19 wherein said pivot is between said bias means and said valve body.

21. The antilock brake device of claim 19 wherein said modulator further has an indicator circuit, said indicator circuit being constructed and arranged to indicate operation of said lever with movement in said first stage.

22. The antilock brake device of claim 1 wherein said deceleration sensor further includes a lever coupled with said flywheel to indicate wheel deceleration, said modulator including an indicator circuit for sensing movement of said lever, said indicator circuit being constructed and arranged to indicate operation of said lever prior to actuation of said modulator.

23. The antilock brake device of claim 1 wherein said modulator includes an input chamber for receiving actuating hydraulic pressure, an output chamber for delivering actuating hydraulic pressure and a control valve therebetween, said control valve including a valve element and a valve seat, said valve element being of substantially lighter material than steel.

24. The antilock brake device of claim 23 wherein said valve element is of ceramic material.

25. The antilock brake device of claim 23 wherein said valve element is of fiber reinforced resin material.

26. The antilock brake device of claim 1 wherein said modulator and sensor system have a response frequency significantly less than a natural frequency in bending of the suspension.

27. The antilock brake device of claim 1 further comprising a second hydraulic brake system, said second hydraulic brake system being in hydraulic communication with said hydraulic brake system upstream of said hydraulic modulator, said second hydraulic brake system including a proportional pressure reducing valve therein.

28. The antilock brake device of claim 27 wherein said hydraulic brake system is on a front wheel of the vehicle and said second hydraulic brake system is on a rear wheel of the vehicle.

29. An antilock brake device for a vehicle having a suspension for mounting a wheel, comprising
an axle mounted to the suspension;
a wheel hub rotatably mounted about said axle and having an enlarged recess on a first side thereof about said axle;
a hydraulic brake system;
a deceleration sensor including a flywheel positioned within said enlarged recess of said wheel hub about said axle, said flywheel being positioned to rotate about said axle;
a drive shaft rotatably mounted about said axle and operatively coupled with said deceleration sensor; and
a hydraulic modulator coupled with said hydraulic brake system and with said deceleration sensor and including a hydraulic pump having a pump shaft, said pump shaft being coupled with said drive shaft and being laterally displaced from the axis of said drive shaft.

30. The antilock brake device of claim 29 wherein said modulator is arranged outwardly of said enlarged recess of said wheel hub at the inlet of said enlarged recess, said pump shaft extending outwardly of said enlarged recess to said modulator.

31. The antilock brake device of claim 30 wherein said modulator is rigidly fixed on a back surface of the suspension relative to the vehicle.

32. The antilock brake device of claim 29 further comprising a pump transmission coupling said pump shaft to said drive shaft.

33. The antilock brake device of claim 29 wherein said pump shaft is a camshaft.

34. The antilock brake device of claim 29 wherein said camshaft is rotatably mounted parallel to said drive shaft.

35. An antilock brake device for a vehicle having a suspension for mounting a wheel, comprising
an axle mounted to the suspension;
a wheel hub rotatably mounted about said axle and
a hydraulic brake system;
a deceleration sensor including a flywheel positioned within the recess of said wheel hub about said axle, said flywheel being positioned to rotate about said axle;
a transmission coupled with said wheel hub and said deceleration sensor and positioned within said recess of said wheel hub about said axle;
a hydraulic modulator coupled with said hydraulic brake system and with said deceleration sensor; and
a cover extending substantially across the inlet of said recess of said wheel hub, said cover being fixed relative to the suspension and extending inwardly to surround said deceleration sensor and including a seal inwardly of said deceleration sensor to form a sealed cavity about said sensor.

36. The antilock brake device of claim 35 wherein said transmission includes a planetary gear train having a sun gear, planetary gears, a ring gear, and a plurality of planetary gear shafts rotatably mounting said planetary gears, said cover being coupled with one of said plurality of planetary gear shafts and said ring gear.

37. The antilock brake device of claim 36 wherein said ring gear is fixed to said cover.

38. The antilock brake device of claim 36 wherein said plurality of planetary gear shafts are fixed relative to said cover.

39. The antilock brake device of claim 35 wherein said cover surrounds said transmission.

40. An antilock brake device for a vehicle having a suspension for mounting a wheel, comprising
an axle mounted to the suspension;
a wheel hub rotatably mounted about said axle and having an enlarged recess on a first side thereof about said axle;
bearings between said axle and said wheel hub to rotatably mount said wheel hub, said bearings being to one side of said recess;
a hydraulic brake system;
a deceleration sensor including a flywheel positioned within said recess of said wheel hub about said axle, said flywheel being positioned to rotate about said axle;
a transmission coupled with said wheel hub and said deceleration sensor and positioned within said recess of said wheel hub about said axle; and
a hydraulic modulator coupled with said hydraulic brake system and with said deceleration sensor.

41. An antilock brake device for a vehicle having a suspension for mounting a wheel, comprising
an axle mounted to the suspension;

a wheel hub rotatably mounted about said axle;

a hydraulic brake system;

a deceleration sensor including a flywheel positioned about said axle, said flywheel being positioned to rotate about said axle;

a transmission coupled with said wheel hub and said deceleration sensor and positioned about said axle; and a hydraulic modulator coupled with said hydraulic brake system and with said deceleration sensor and including a hydraulic pump having a pump shaft, said pump shaft being operatively coupled with said transmission and being laterally displaced therefrom.

42. The antilock brake device of claim 41 further comprising a drive shaft rotatably mounted about said axle, said transmission being coupled with said drive shaft, said pump shaft being coupled with said drive shaft and said flywheel of said deceleration sensor being mounted about said drive shaft and being coupled with said transmission through said drive shaft.

43. The antilock brake device of claim 42 wherein said flywheel of said deceleration sensor is frictionally coupled with said drive shaft.

44. The antilock brake device of claim 42 further comprising a pump transmission including a gear coupling said drive shaft and said pump shaft.

45. The antilock brake device of claim 44 wherein said pump shaft is parallel to said drive shaft.

46. The antilock brake device of claim 42 wherein said transmission includes a planetary gear system having a ring gear, planetary gears, a sun gear and a plurality of planetary gear shafts rotatably mounting said planetary gears, said sun gear being fixed to said drive shaft.

47. The antilock brake device of claim 46 wherein said wheel hub is fixed to one of said ring gear and said plurality of plentary gear shafts.

48. The antilock brake device of claim 47 wherein the other of said ring gear and said plurality of planetary gear shafts are fixed relative to the suspension.

49. An antilock brake device for a vehicle having a suspension for mounting a wheel, comprising an axle mounted to the suspension;

a wheel hub rotatably mounted about said axle;

bearings between said axle and said wheel hub to rotatably mount said wheel hub, said bearings being offset toward one side of the center plane of the wheel;

a hydraulic brake system;

a deceleration sensor including a flywheel positioned about said axle to one side of said bearings, said flywheel being positioned to rotate about said axle;

a drive shaft about said axle operatively coupled to said wheel hub and said flywheel; and a hydraulic modulator coupled with said hydraulic brake system and with said deceleration sensor.

50. An antilock brake device for a wheel for a vehicle, comprising a hydraulic brake system;

a deceleration sensor including a flywheel about a shaft, said shaft transmitting a rotation of the wheel to the flywheel; and a hydraulic modulator coupled with the hydraulic brake system as well as with the deceleration sensor and including a hydraulic pump having a pump shaft, said pump shaft being driven by a rotational force of the wheel and being laterally displaced from said shaft.

51. The antilock brake device of claim 50 wherein the pump shaft receives the rotational force of the wheel via said shaft.

52. The antilock brake device of claim 51 wherein said flywheel of said sensor is disposed concentrically about said shaft, said flywheel receiving a rotational force from said shaft on one of opposite sides of said flywheel and said pump shaft receiving a rotational force from said shaft on the other side of said flywheel.

53. The antilock brake device of claim 52 wherein said pump shaft is connected to said shaft through gearing.

54. The antilock brake device of claim 53 wherein said pump shaft is connected to said shaft through gearing.

* * * * *

UNITED STATES PATENT AND TRADEMARK OFFICE
CERTIFICATE OF CORRECTION

PATENT NO. : 4,792,194
DATED : December 20, 1988
INVENTOR(S) : Tsutomu Hayashi et al.

It is certified that error appears in the above-identified patent and that said Letters Patent is hereby corrected as shown below:

In column 13, line 50, after "shaft," insert -- said flywheel being operatively coupled with said drive shaft --.

In column 14, line 57, delete "10" and insert -- 16 -- therefor.

In column 16, line 11, delete "29" and insert -- 33 -- therefor.

In column 18, line 41, delete "53" and insert --    -- therefor.

Signed and Sealed this

Fifth Day of September, 1989

Attest:

DONALD J. QUIGG

Attesting Officer

Commissioner of Patents and Trademarks